United States Patent [19]

Grimsby

[11] 4,456,557

[45] Jun. 26, 1984

[54] OILSEED EXTRACTION PROCESS

[75] Inventor: Frank N. Grimsby, Houston, Tex.

[73] Assignee: Shell Oil Company, Houston, Tex.

[21] Appl. No.: 376,087

[22] Filed: May 7, 1982

[51] Int. Cl.$^3$ .......... C07F 5/02; C11B 1/00

[52] U.S. Cl. .......... 260/412.4

[58] Field of Search .......... 260/412.4

[56] References Cited

U.S. PATENT DOCUMENTS 2,857,411 10/1958 D'Aquin et al. .......... 260/412.4

4,298,540 11/1981 Youn et al. .......... 260/412.4

*Primary Examiner*—Helen M. S. Sneed

[57] ABSTRACT

A process for the extraction of oilseeds which comprises steps for extracting oil from oilseeds by contacting the seeds in a presoaking zone with an isopropanol-based presoak solvent to obtain presoaked seeds, extracting the presoaked seeds by contact with an isopropanol-based extraction solvent in a multi-stage countercurrent extraction zone to obtain an extraction miscella and an extracted seed meal, and recovering oil from the extraction miscella. Processing efficiency is enhanced by the presoaking contact step when the relative water content of the presoak solvent is less than that of the extraction miscella.

6 Claims, 2 Drawing Figures

OILSEED EXTRACTION PROCESS

BACKGROUND OF THE INVENTION

The present invention relates to an improvement in the processing of oilseeds such as, for example, soybean, cottonseed, corn, peanut, safflower, sunflower, and palm. More particularly, the invention relates to an improved process for the extraction of oils from oilseeds utilizing an isopropyl alcohol-based extraction solvent.

The oilseed industry of the United States produces on an annual basis about thirteen million tons of seed oils from roughly one billion bushels of seed crops, predominantly soybean and cottonseed. Essentially all of this oil is recovered from the seeds by multi-stage countercurrent solvent extraction. The oils find primary use in foods, e.g., shortening, margarine, cooking oils, and salad oils, while seed meal from which the oil has been extracted, having a high protein content, is generally processed into animal feeds. About two percent of this meal is further refined for human consumption.

In the recovery of seed oils, the industry consumes large quantities of extraction solvent. Hexane has long been recognized as the standard solvent in the industry, due in part to its low cost relative to other solvents and in part to its physical and chemical properties. However, in recent years incentive has developed for the replacement of hexane as the solvent of choice for oilseed extraction. Increasing hexane costs and possibilities of supply shortages account for some of this incentive. In addition, for health and safety reasons, solvent specifications in the industry, precautions to prevent exposure of workers to hexane, and relevant hydrocarbon emission standards may be tightened. Furthermore, interest in producing an upgraded seed meal, for instance a meal suitable for human consumption without the need for secondary extraction or other refining, has given rise to attempts at use of alternate extraction solvents.

Of particular relevance to the present invention is the prior art relating to extraction of oilseeds with an isopropanol-based solvent. Characteristics of isopropanol extraction are generally well known and are described, for instance, by Harris et al in a three-part publication entitled "Isopropanol as a Solvent for Extraction of Cottonseed Oil" (J. Am. Oil. Chem. Soc., November 1947, Vol. 24, p. 370–375; December 1949, Vol 26, p. 719–723; and July 1950, Vol. 27, p. 273–275). More recent developments in oilseed processing with isopropanol are outlined by Youn and Wilpers in U.S. Pat. No. 4,298,540.

It is recognized that, although isopropanol is in many respects attractive for use as an oilseed extractant, it cannot as a practical matter be directly substituted in a process designed for use of a hexane solvent. Direct substitution would, for example, entail substantial increases in process energy requirements. Under conventional hexane extraction processing, solvent (e.g., for recycle) is recovered from both the oil and meal products by evaporation. However, because energy necessary for this evaporation is a major factor in processing costs, because the heat of vaporization of an isopropanol-water azeotrope is nearly three times that of hexane, and because isopropanol extraction typically requires greater quantities of solvent than hexane extraction, it is not economically feasible to practice a like evaporation of isopropanol-based solvent. The above-referenced publications of Harris et al describe a method for cooling and phase separating solvent and extracted oil in the process extract, or miscella as it is known in the art, which has advantages in energy conservation over evaporative separation.

It is an object of this invention to enhance the efficiency of seedoil recovery in an oilseed extraction process utilizing an isopropanol-based solvent, particularly a process in which miscella is cooled and phase separated to obtain oil-rich and solvent-rich streams.

SUMMARY OF THE INVENTION

It has now been found that the efficiency of an oilseed extraction process utilizing an isopropanol-based extraction solvent is enhanced if before the seed feedstock is introduced into a multi-stage countercurrent extraction zone it is first contacted in a separate seed/solvent contact zone, termed a presoaking zone, with an isopropanol-based solvent, termed a presoak solvent, of relatively low water content. This initial contact in the presoak zone yields presoaked seeds which are then subjected, suitably according to conventional practice, to multi-stage countercurrent contact with isopropanol-based extraction solvent.

Enhancement in process efficiency is related to solubility aspects particular to the isopropanol-based solvent. Unlike hexane, isopropanol extracts both water as well as oil from the oilseeds. High water content of solvent substantially reduces the solvent power of the isopropanol, particularly in the first stages of the multi-stage countercurrent extraction zone (that is, the first stages with respect to the movement of seeds through the zone). By reducing water (and also oil) content of the extraction feed through an initial presoak contact with a small quantity of a relatively dry isopropanol-based solvent, the invention improves the extraction efficiency of each stage of the subsequent countercurrent extraction and of the overall process. Examples of the practical advantages which can be taken of the invention, in comparison to conventional processing, include use of a lesser total quantity of extraction solvent, a greater process throughput in a given extraction zone, and a more complete recovery of available seedoils.

Accordingly, the invention may be briefly described as a process for the separation of oils from seeds containing extractible oils, which comprises steps of contacting the seeds in a presoaking zone with an isopropanol-based presoak solvent to obtain presoaked seeds extracting the presoaked seeds by contact with an isopropanol-based extraction solvent in a multi-stage countercurrent extraction zone to obtain an extraction miscella and an extracted seed meal, and recovering oils from the extraction miscella, under the provision that the weight ratio of water to isopropanol in the presoak solvent is less than the weight ratio of water to isopropanol in the extraction miscella.

The invention is particularly beneficial in application to an extraction process comprising steps for cooling and phase-separating the extracted miscella into oil-rich and solvent-rich streams. In this aspect, the invention takes advantage of the enhanced solubility characteristics of an isopropanol solvent of low water content, without suffering disadvantages associated with low water content in phase separation of the extraction miscella. The success of such a phase separation is critical to the efficiency of the isopropanol oilseed extraction process from the viewpoint of energy utilization. In turn, efficient phase separation depends upon a relatively high content of water in the extraction miscella. In effect, the water functions to aid the phase separation between the isopropanol with which water is miscible and the oil with which it is not.

DESCRIPTION OF THE DRAWING

The invention is further illustrated in the two figures of the attached drawing.

Figure 1:
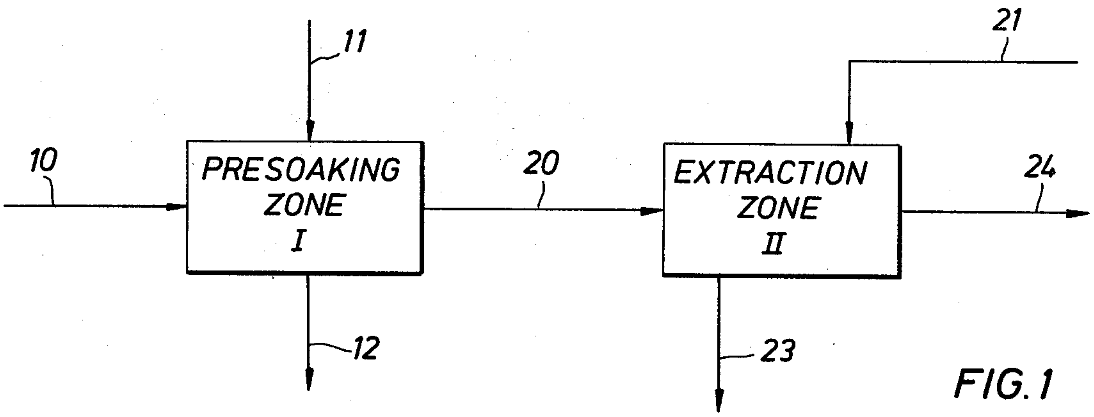
FIG. 1 depicts in simplified schematic flow diagram fashion the most general aspects of the invention. With reference to this FIG. 1, a process feed stream, designated 10, consisting of the meats of oilseeds, for example, soybeans, is introduced into a presoaking zone I. Prior to extraction, the oilseeds have optionally but preferably been subjected to conventional preparation steps, not here shown, for flaking of the meats, adjusting their water content, etc. Also introduced into the presoaking zone for contact with the seeds is a flow of a suitable isopropanol-based presoak solvent 11. The contact in the presoaking zone produces presoaked seeds of reduced oil content 20 and, optionally, a presoak miscella 12. The presoaked seeds are subsequently contacted with a suitable isopropanol-based extraction solvent 21 in multistage, countercurrent extraction zone II to obtain an extracted seed meal 24 and an extraction miscella 23. The extraction miscella stream 23 and the optional stream 12 are treated either individually or in combination for recovery of the oil content thereof.

It is a necessary restriction upon practice of the general aspects of the process shown in FIG. 1, that presoak solvent 11 be characterized by a lower ratio of water content to isopropanol than that which characterizes the extraction miscella 23.

Figure 2:
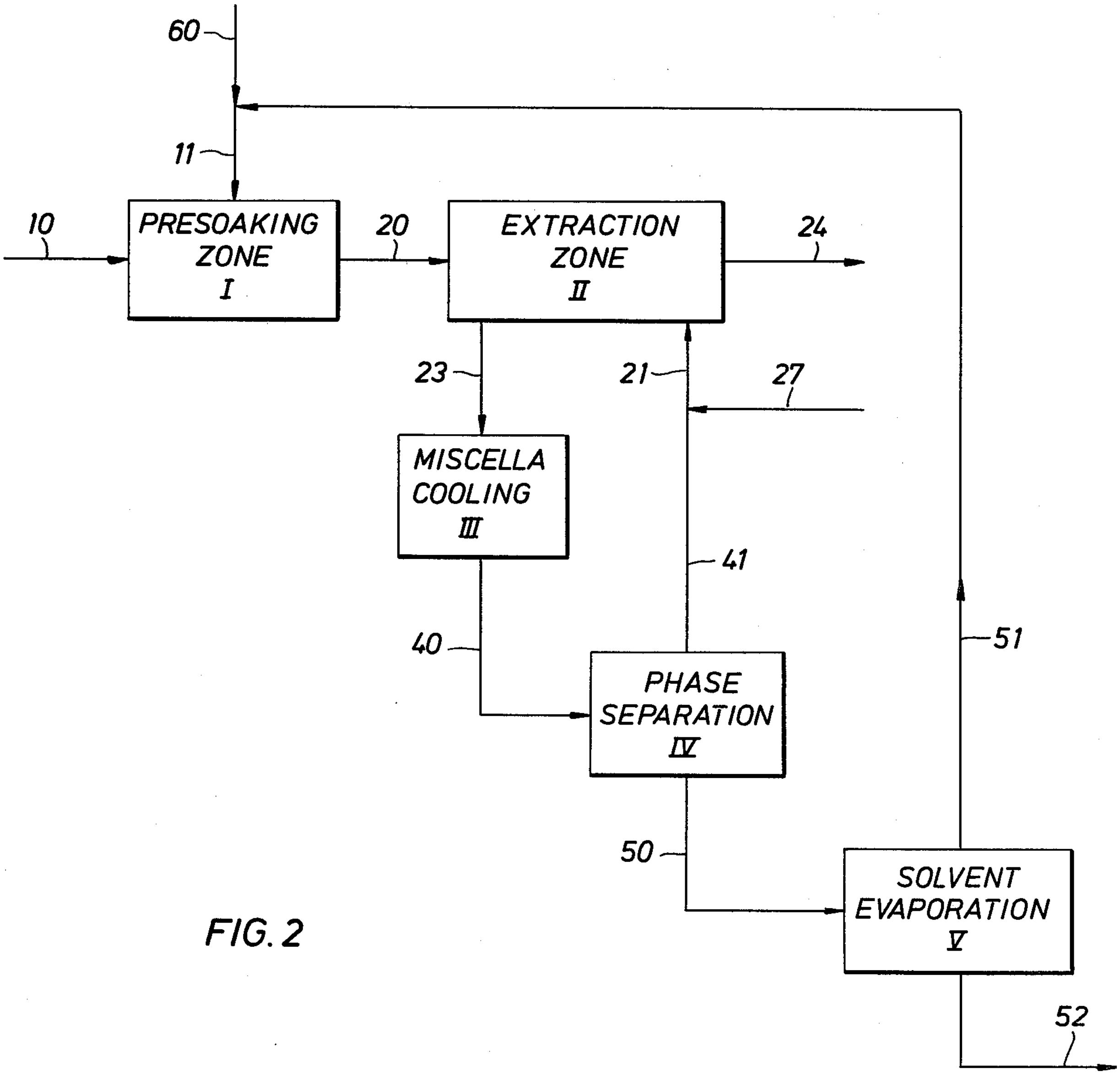

FIG. 2 depicts an integrated process which represents a particularly preferred embodiment of the invention. The function of the presoaking zone and the extraction zone and the nature of associated process flows are the same as indicated for the corresponding zones and flows in FIG. 1. In this embodiment, the quantity of presoak solvent 11 introduced into zone I is less than that which the seeds 10 have the capacity to absorb or otherwise retain and no presoak miscella is withdrawn as is stream 12 in FIG. 1. Extraction miscella 23 is cooled in a miscella cooling zone III. Cooled miscella 40 is phase separated in zone IV to obtain a solvent-rich stream 41 which is recycled to the extraction zone II, suitably in combination with one or more other solvent feed or recycle solvent streams 27. Phase separation also yields an oil-rich stream 50. Evaporation of residual solvent from stream 50 in zone V produces a solvent stream 51 of low water content, for example, less than about 10 percent by weight (%w) under typical processing conditions. Stream 51 is recycled to the presoaking zone as presoak solvent 11. Optionally combined with stream 51 to give the presoak solvent 11, are one or more other isopropanol-based solvent streams 60 of suitably low water content, for instance a fresh, make-up solvent stream or a portion of a recycle extraction solvent such as stream 21, which has been processed to reduce its water content.

DESCRIPTION OF THE PREFERRED EMBODIMENTS

The present invention is broadly applicable to any process in which oils are extracted from oilseeds by multi-stage countercurrent contact with an isopropanol-based extraction solvent. Such extraction is suitably conducted using conventional equipment and applying general procedures well known in the oilseed extraction art, including those heretofore utilized in hexane solvent extraction processes. Preferred aspects of oilseed extraction processing relating to use of an isopropanol-based solvent are described in the above-cited publications and patent, and in the copending, commonly assigned applications of F. N. Grimsby, Ser. No. 376,085, and Ser. No. 376,086, both filed on even date herewith, the teachings of each of which on these points are incorporated herein by reference. For purposes of the invention, the isopropanol-based extraction solvent preferably consists essentially of isopropanol, water and small quantities of oils and other substances which have been extracted from the oilseeds. It is known, however, that isopropanol-based solvents may comprise in minor amount, i.e., less than about 20%w calculated on isopropanol, other seedoil solvent materials, e.g., ethanol or acetone. Such solvent mixtures are generally suitable for use in the invention, although it is preferred that the isopropanol-based extraction solvent is substantially free of these other materials. The isopropanol-based solvent typically contains water in a relative quantity about equal to or greater than that in the 88%w isopropanol, 12%w water azeotrope, for example, between about 10 and 20%w water to about 80 to 90%w isopropanol, although the specific content of water in the solvent is not critical to the invention. The process of the invention is not intended for application to oilseed extractions which employ hexane-based solvents.

While the invention is not limited in its application to any specific type of oilseed, specific mention may be made, as examples of suitable process feedstocks, of soybean, cottonseed, corn, peanut, safflower, sunflower, and palm. Soybean and cottonseed oil recovery are of particular interest.

For purposes of the invention, the oilseed feedstock, prior to its contact with extraction solvent in the multi-stage countercurrent extraction zone, is contacted with an isopropanol-based solvent of relatively low water content. This contact is herein termed a presoak and the solvent a presoak solvent. The presoak solvent is suitably characterized by a composition such as that of the extraction solvent, with the exception of a restriction upon water content. In most general terms, the water content of the presoak solvent is less than that of the extraction miscella. This provision guarantees that the first solvent (presoak solvent) which the seeds contact under the invention has a lower content of water than that of the solvent which the seeds would otherwise contact in the initial stage of multi-stage countercurrent extraction zone. As a general rule, efficient operation also requires that the presoak solvent should have a water content less than about 16 percent by weight (%w) calculated on the total weight of isopropanol and water in the presoak solvent. Water content in the presoak solvent is preferably less than about 12%w, more preferably less than about 10%w, and most preferably less than about 7%w, calculated on total weight of the presoak solvent.

Contact between seeds and presoak solvent is carried out in a presoaking zone which provides for containment of and intimate contact between the seed and solvent mixture. The presoaking zone may comprise one or more contact stages which may take the form of stages in a conventional oilseed extraction zone, distinct, of course, from the extraction zone in which presoaked seeds contact extraction solvent in the process of the invention. Alternatively, the zone may suitably take other forms, for example, presoak solvent can be introduced directly into the conveying device (e.g., screw conveyor, hopper or the like) which is used to transport seeds to the extraction zone. If desired, the contact between the seed feedstock and presoak solvent and the subsequent contact between presoaked seeds and extraction solvent may be accomplished in a single extractor. In such a case, presoak solvent is introduced into, and presoak contact takes place in, one or more of the extractor stages at or near the point of introduction of the seed feedstock. Extraction solvent, passing through the extractor countercurrent to the direction of the seeds is withdrawn as miscella at a point downstream with respect to seed movement (and upstream with respect to extraction solvent flow) from the extractor stages utilized for contact between the seeds and the presoak solvent. Presoak solvent may be either withdrawn as presoak miscella at a point upstream (with respect to seed movement) from that at which the seeds first contact extraction solvent and extraction miscella is withdrawn, or it may pass cocurrently with the seeds and exit the extractor in combination with the extraction miscella. The two solvent flows (presoak and extraction solvents) are thus segregated to provide the presoak and extraction contacts with seeds in separate stages of the same extractor. Presoak solvent can be introduced as a liquid, a vapor, or a vapor and liquid mixture. A presoak solvent at least partially in vapor form is particularly advantageous if the temperature of the seeds introduced into the presoak zone is below the dew point of the presoak solvent, in which case the contact of presoak solvent with seeds simultaneously cools and condenses the solvent, preheats the seeds before extraction, and serves to presoak the seeds for purposes of the invention.

The specific quantity of presoak solvent contacted with the seeds is not critical to the invention. Small quantities, for instance, 0.01 to 0.2 pounds of presoak solvent per pound of seed feedstock provide definite advantage. High presoak solvent to seed ratios, for instance, greater than about 2 pounds of presoak solvent per pound of seeds, or greater than about half of the total of presoak solvent and extraction solvent, are preferably avoided, primarily from the standpoint process efficiency and economics of subsequent miscella separation. For example, the relatively low water content of a miscella resulting from the use of an excessive amount of presoak solvent gives rise to inefficient phase separation of the presoak miscella (either alone or in combination with the extraction miscella) into oil-rich and solvent-rich components. Presoak solvent to seed ratios between about 0.01 and 2 pounds of solvent per pound of seed are thus preferred, while a ratio between about 0.015 and 1.0 is considered more preferred and a ratio between about 0.02 and 0.5 are most preferred.

As indicated above, the invention is suitably practiced either with or without a step for withdrawal of a liquid presoak miscella from the presoaking zone. In the practice of process embodiments employing relatively small quantities of presoak solvent, it is often necessarily the case that all of the presoak solvent is absorbed or otherwise retained by the seed feedstock and exits the presoak zone with the presoaked seeds. No separate presoak miscella stream is then obtained.

Operating temperature and pressure of the presoaking zone are not critical to the invention, and are very suitably in the same ranges known in the prior art for extractor operation using isopropanol-based solvents. Near atmospheric pressures and elevated temperatures, e.g., in the range from about 140° to 176° F., are particularly preferred.

The invention is further described through the following example.

EXAMPLE

Again referring to FIG. 1 of the drawing for description of a representative continuous process embodiment of the invention, flaked soybeans are introduced as solvent extraction process feedstream 10 to the presoaking zone I. For a typical commercial-scale process embodiment, stream 10 totals 41.7 tons per hour, of which about 29.2 tons is meal on a dry basis, about 8.2 tons are extractible substances (principally oil), and about 4.3 tons is water. Also introduced into zone I is an isopropanol-based presoak solvent stream of relatively low water content, here stream 11 containing about 10.3 tons per hour of isopropanol and about 0.7 tons per hour of water. Contact between the soybens 10 and the presoak solvent 11 in zone I yields presoaked seeds which are withdrawn as stream 20 and introduced into multistage, countercurrent extraction zone II. Stream 20 contains both the seed feedstock of stream 10 and the presoak solvent of stream 11—in this case the quantity of presoak solvent is less than that retained by the seeds as a result of contact in zone I and no separate presoak miscella is withdrawn as stream 12. Thus, the total flowrate of stream 20 is about 52.7 tons per hour. The presoaked seeds 20 are contacted in extraction zone II with at least one extraction solvent stream 21 to obtain an extraction miscella 23 and an extracted seed meal 24. In this embodiment solvent stream consists of about 105.0 tons per hour (5.0 tons of oil, 84.0 tons of isopropanol, and 16.0 tons of water); extraction miscella consists of about 96.9 tons per hour (12.2 tons oil, 72.2 tons isopropanol, and 12.5 tons water); and stream 24 consists of about 60.8 tons per hour (29.2 tons meal (dry basis), 1.0 tons oil, 22.1 tons isopropanol, and 8.5 tons water).

Referring to FIG. 2, the extraction miscell stream 23 is subsequently subjected to cooling in zone III and cooled miscella 40 to phase separation in zone IV to recover oil therefrom.

I claim as my invention:

1. A process for the separation of oils from seeds containing extractible oils, which comprises steps for contacting the seeds in a presoaking zone with an isopropanol-based presoak solvent to obtain presoaked seeds, extracting the presoaked seeds by contact with an isopropanol-based extraction solvent containing between about 10 and 20 percent by weight water in a multi-stage countercurrent extraction zone to obtain an extraction miscella and an extracted seed meal, and recovering oils from the extraction miscella, under the provision that the weight ratio of water to isopropanol in the presoak solvent is less than the weight ratio of water to isopropanol in the extraction miscella.

2. The process of claim 1, wherein the presoak solvent contains less than about 16 percent by weight of water, calculated on the total weight of isopropanol and water in the presoak solvent.

3. The process of claim 2, wherein the presoak solvent contains less than about 12 percent by weight water, calculated on total weight of presoak solvent.

4. The process of claim 3, wherein the presoak solvent contains less than about 10 percent by weight water, calculated on total weight of presoak solvent.

5. The process of claim 4, wherein the presoak solvent contains less than about 7 percent by weight water, calculated on the total weight of presoak solvent.

6. A process for the separation of oils from seeds containing extractible oils, which comprises steps for contacting the seeds in a presoaking zone with an isopropanol-based presoak solvent to obtain presoaked seeds, extracting the presoaked seeds by contact with an isopropanol-based extraction solvent containing between about 10 and 20 percent by weight water in a multi-stage countercurrent extraction zone to obtain an extraction miscella and an extracted seed meal, cooling and phase separating the extraction miscella to obtain a solvent-rich stream and an oil-rich stream, evaporating residual solvent from the oil-rich stream, and recycling the evaporated solvent to the presoak zone as presoak solvent.

* * * * *